UNITED STATES PATENT OFFICE.

BENJAMIN MOORE, OF BROOKLYN, NEW YORK.

WALL-FINISH AND METHOD OF MAKING SAME.

SPECIFICATION forming part of Letters Patent No. 488,024, dated December 13, 1892.

Application filed September 26, 1892. Serial No. 446,949. (No model.)

*To all whom it may concern:*

Be it known that I, BENJAMIN MOORE, a citizen of the United States, residing at Brooklyn, in the county of Kings and State of New York, have invented certain new and useful Improvements in Wall-Finishes and Methods of Making the Same; and I do hereby declare the following to be a full, clear, and exact description of the invention, such as will enable others skilled in the art to which it appertains to make and use the same.

The object of my invention is to produce a wall-finish or calcimine which may be applied hot immediately after mixing, will stand a second or third coat, shall form a particularly-firm finish, and will not run, crawl, or separate either on the brush or on the surface to which it is applied, and in the formation of which American china-clay can be used without such clay settling, as it does when its use is attempted in the formation of ordinary wall-finishes.

The calcimines now best known in the market are composed of a mixture of carbonates of lime or gypsum or some similar base with glue or with alum and glue. Calcimines thus made have to wet up with hot water when they are to be applied to the wall or other surface for which they are destined, and although warm water is thus necessary for their preparation the mixture must be cooled before being applied to the surface. My improved calcimine or wall-finish is ready to use while hot, and thus the delay of waiting for it to cool is avoided, and a vastly-superior article is obtained, as will be hereinafter set forth.

The process by which my improved wall-finish is made is as follows: I take three pounds of the vegetable substance known to the trade as "Irish moss" and mix it with fifty gallons of water. This mixture is then boiled for two hours, or until it becomes a jelly, the substance of the moss becoming dissolved and held in suspension by the water. The solution is then strained by being passed through coarse cloth or any other suitable straining medium, and the strained liquid is thoroughly mixed with one ton (two thousand pounds) of the natural silicate of alumina, known to the trade as "American china-clay." This mixture is then ground through a stone mill, so as to complete the intimate mixture of the jelly-like substance of the boiled moss fiber with the clay. The product of the mill is then dried, so as to evaporate out all the water, and pulverized to about one hundred and eighty mesh—the fineness of fine flour—by running it through any proper grinding-machine, the class of machines known to the trade as "disintegrators" being preferred. Thus dried and pulverized, the material is mixed with alum and glue in the proportion of ninety-three and one-half parts, by weight, of the clay mixture, one and one-half parts of alum, and five parts of glue. As the water has been all dried out, there remains the two thousand pounds of American china-clay and the three pounds of boiled moss. The amount of alum to be added to this in the above-stated proportion would then be thirty pounds and the amount of glue one hundred pounds. The analysis of the resultant mixture would then be as follows: china-clay, two thousand pounds; Irish moss, three pounds; glue, one hundred pounds; alum, thirty pounds.

The proportions above given may be varied within limit without destroying the many advantages of the resultant product, and such variations of proportions do not take the product outside of the scope of my invention; but the best results are obtained by the exact proportions above specified, and these I prefer.

The resultant product is the improved wall-finish or calcimine, which I call "Muresco." It is put up dry in paper or other suitable packages and is ready for shipment.

In using my invention the material produced by the above-described process should be mixed with hot water, boiling hot being preferred, in the proportion of a pint of water to every pound of the material, and stirred well till all the ingredients are dissolved. The mixture should then be applied with a brush while warm. Plenty of the stuff should be kept on the brush, and it should be spread on smoothly and evenly, but without trying to rub it out too thin. This gives a first-class job, which shows no "laps" or "clouds." When a second coat is required, it should be applied cold, and preferably the solution should be thinned out by the addition of more water when it is to be applied as a second coat.

The advantages of my invention are that the incorporation of the Irish moss causes the material to jell when mixed up hot and to become a semi-paste, so that the china-clay will not sink to the bottom, as it otherwise would do to a degree that has heretofore rendered its use impracticable. Moreover, the pasty consistency given by the mixture of moss, alum, glue, and clay enables the mixture to be applied hot. The slippery nature of the moss causes the calcimine to work easily, even over an absorbent ceiling, and it can be spread on without showing clouds or laps after it dries. For the same reason the coat adheres firmly and is not liable to crack or fall off, as occurs with other wall-finishes applied in the cold state. The moss also gives the stuff a body such that it can be applied to rough and porous walls and ceilings without their first requiring a coat of sizing. For these reasons I regard the discovery that Irish moss when used for this purpose in the manner described has the properties above set out as the most important and distinguishing feature of my invention. Of course any pigment may be mixed and ground with the other constituents of my improved wall-finish to give it any desired color. The least important of the ingredients mentioned above is the alum, and it is possible to make a wall-finish by following the other steps of my process, but omitting the introduction of alum. The article so produced is not equal to that made by following out my process in its entirety; but I consider it substantially an equivalent thereof.

Having therefore described my invention, what I claim as new, and desire to protect by Letters Patent, is—

1. The process of manufacturing a wall-finish, which consists of the following steps: first, boiling thoroughly three pounds of Irish moss in fifty gallons of water; second, straining the resultant solution and mixing it intimately with two thousand pounds of china-clay; third, drying and pulverizing the mixture thus formed and adding alum and glue in the proportions specified, substantially as and for the purposes set forth.

2. As compositions of matter, the improved calcimine or wall-finish composed of the following constituent materials in substantially the following proportion, by weight: china-clay, two thousand parts; Irish moss, three parts; glue, one hundred parts; alum, thirty parts.

In testimony whereof I affix my signature in presence of two witnesses.

BENJAMIN MOORE.

Witnesses:
WARREN W. FOSTER,
A. P. SMITH.